United States Patent [19]

Byrnes et al.

[11] Patent Number: 5,523,530
[45] Date of Patent: Jun. 4, 1996

[54] ELASTOMERIC ACOUSTIC INSULATOR

[75] Inventors: Francis E. Byrnes, White Plains, N.Y.; Ralph D. Costanza, Monroe; Charles Isabelle, Winsted, both of Conn.

[73] Assignee: United Technologies Corporation, Hartford, Conn.

[21] Appl. No.: 279,530

[22] Filed: Jul. 25, 1994

[51] Int. Cl.$^6$ .................................................. F16F 15/00
[52] U.S. Cl. .......................................... 181/208; 248/559
[58] Field of Search .................................. 181/207, 208, 181/209; 248/559, 638

[56] References Cited

U.S. PATENT DOCUMENTS

| | | | |
|---|---|---|---|
| 4,440,375 | 4/1984 | Fukushima et al. | 248/559 |
| 4,456,213 | 6/1984 | Fukushima et al. | 248/559 |
| 4,637,584 | 1/1987 | Takehara | 248/559 |

*Primary Examiner*—Khanh Dang
*Attorney, Agent, or Firm*—McAulay Fisher Nissen Goldberg & Kiel

[57] ABSTRACT

An acoustic isolator is incorporated between a noise generating device and a support structure, such as between a transmission housing and an airframe. The isolator has a first fitting which attaches to the noise generating device, and a second fitting which attaches to the support structure, with an acoustic attenuation member disposed therebetween. Preferably, a first elastomer member is disposed between a pair of vertical walls of the first and second fittings. Optionally, a second elastomer member is disposed between an upper surface of the supporting structure and a lower surface of the second fitting such that horizontal loads are reacted therethrough. Alternatively the first and second elastomers comprise a spherical elastomer member and a cylindrical elastomer member in the form of a spherical bearing. The acoustic isolator thus allows rigid attachment of the adjacent structures yet provides acoustic isolation of complex forces which would normally transmit noise through the structure, particularly those from the vertical, lateral and fore/aft directions. Utilizing the inventive acoustic isolator, noise transmission through the support structure can be substantially reduced.

7 Claims, 4 Drawing Sheets

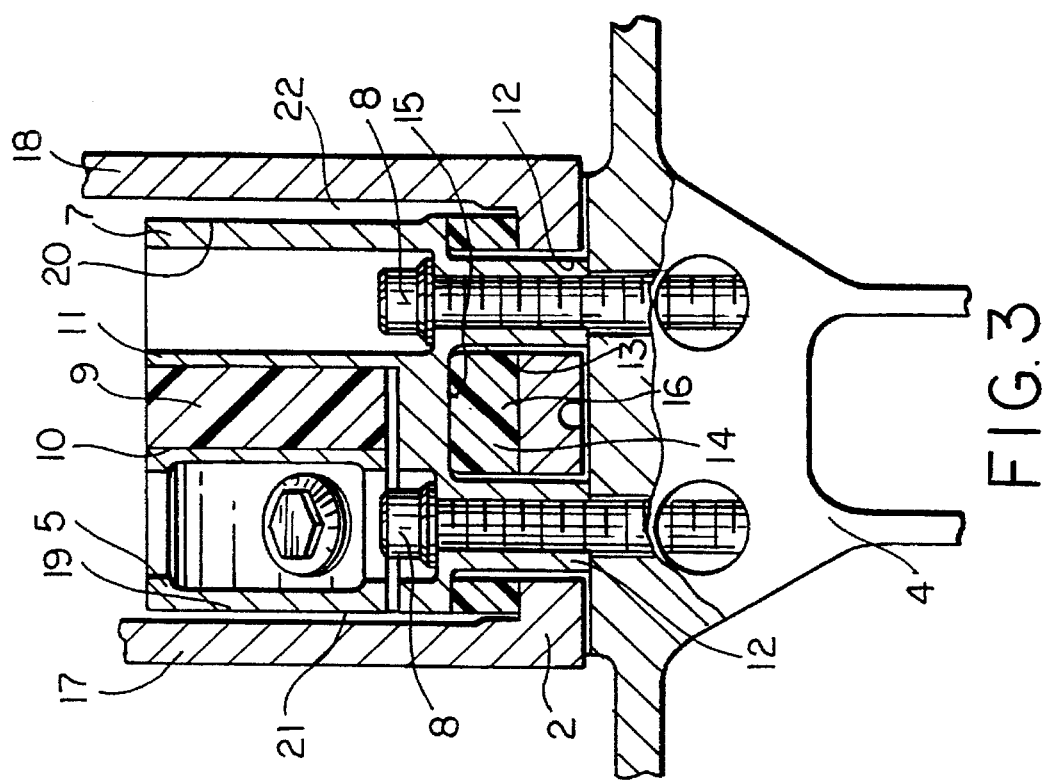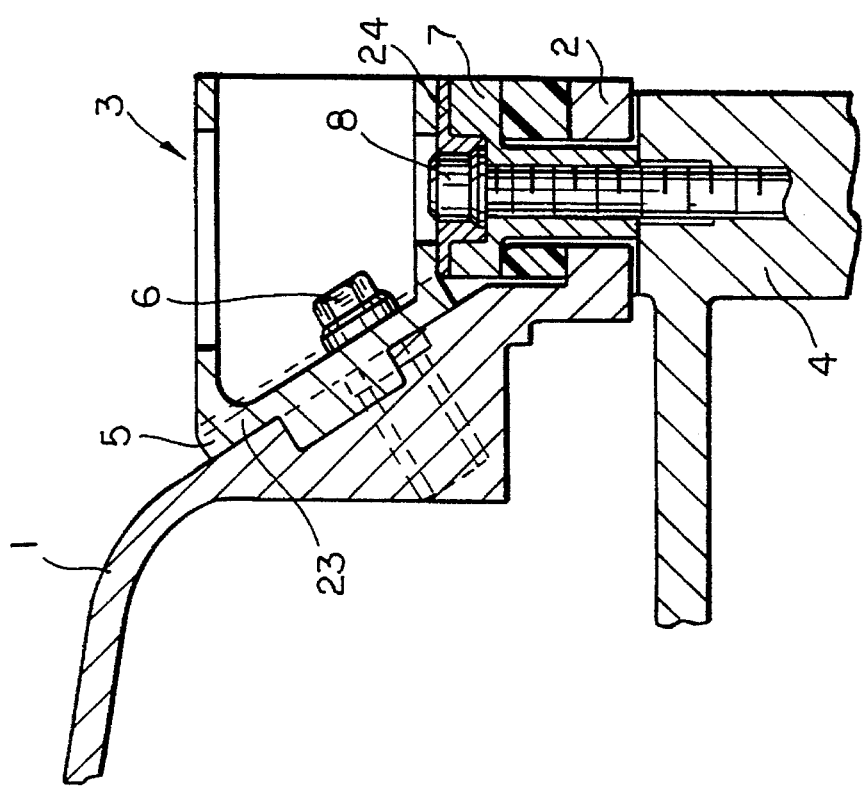

ELASTOMERIC ACOUSTIC INSULATOR

TECHNICAL FIELD

This invention relates to acoustic isolators and particularly to an elastomeric acoustic isolator for limiting noise transmission between adjacent structures.

BACKGROUND OF THE INVENTION

It is important in the design of various types of equipment to limit the transmission of noise and vibration to adjacent structures. In particular, in an aircraft such as a helicopter, it is required that cabin noise be limited so as not to disturb the cabin occupants. A major source for noise in such an aircraft is caused by high frequency vibration transmitted to the cabin area from the overhead drive structure. A major cause of the high frequency vibration is the meshing of gear teeth in the rotor transmission, and the gear clash of the bevel pinions with the main bull gear. Typically, the transmission is mounted directly to an airframe supporting structure, which also comprises the frame for the cabin. The high frequency vibrations, along with other such vibrations hereinafter referred to collectively as "noise" are transmitted through the structural members which mount the transmission to the airframe. It is estimated that 90% of the cabin noise is structurally transmitted, rather than airborne transmitted.

As power requirements have increased, the amount of noise transmitted through the structure to the cabin has correspondingly increased. At the same time, noise requirements have become more restrictive, and it has been found that at these increased power levels, the noise level within the cabin, particularly during high power maneuvering, its too high.

Various attempts have been made to reduce noise, such as incorporating elastomeric sleeve members having high spring stiffness about the bolts which are used to mount the transmission to the airframe. However, the largest noise component is made by lateral vibratory loads and these bypass the sleeve members. Additionally, such sleeves allow the bolts holding the transmission to the airframe to lose torque over time as the elastomer creeps or flows, which is an undesirable result.

Other attempts have been made to reduce noise by adding cabin insulation or complex noise suppression systems, such as those issuing counter frequency noise to eliminate the noise generated, but these attempts add weight and complexity to the aircraft, and are also fairly costly. Consequently, they are not considered satisfactory solutions to the problem.

SUMMARY OF THE INVENTION

It is an object of the present invention to reduce noise transmission from a noise generating device to connected structural members such as from a transmission to a supporting frame.

It is a further object to reduce noise transmission using a low cost simple solution, which does not add substantially to the weight or complexity of the connecting structures.

These and other objects of the present invention are achieved by an acoustic isolator comprising:

a first fitting, means to attach the first fitting to a noise generating structure, a second fitting, means to attach the second fitting to a second structure, acoustic attenuation means disposed between the first and second fittings such that noise generated in the noise generating structure is substantially reduced prior to transmission through the second fitting to the supporting structure.

In one embodiment, the acoustic attenuation means comprise a first elastomer member vertically located between adjacent faces on the first and second fittings, to react vertical and fore/alt loads to reduce noise. In another embodiment, the acoustic attenuation means further comprise a second elastomer member horizontally disposed between the second fitting and the noise generating structure to react lateral loads. The fittings thus are rigidly bolted to the structures, and loss of bolt torque cannot occur. Also, the orientation of the elastomer members assures that substantial acoustic isolation is achieved, despite the complex force structures encountered.

In an alternative embodiment of the present invention, the acoustic attenuation means comprises a spherical bearing having an outer race extending from the first fitting and an inner race extending to the second fitting, with a spherical elastomer member disposed therebetween. In another embodiment, the acoustic attenuation means further comprise a cylindrical elastomer member located between the inner race and the spherical elastomer member, to react lateral loads. Preferably, stop means are incorporated in the various embodiments to assure that any overstress condition or elastomer failure does not result in the first and second fittings separation.

BRIEF DESCRIPTION OF THE DRAWINGS

FIG. 2 is a side cross sectional view of one embodiment of the acoustic isolator of the invention.

FIG. 3 is a front cross sectional view of the acoustic isolator of the invention.

DETAILED DESCRIPTION OF THE INVENTION

Figure 1:
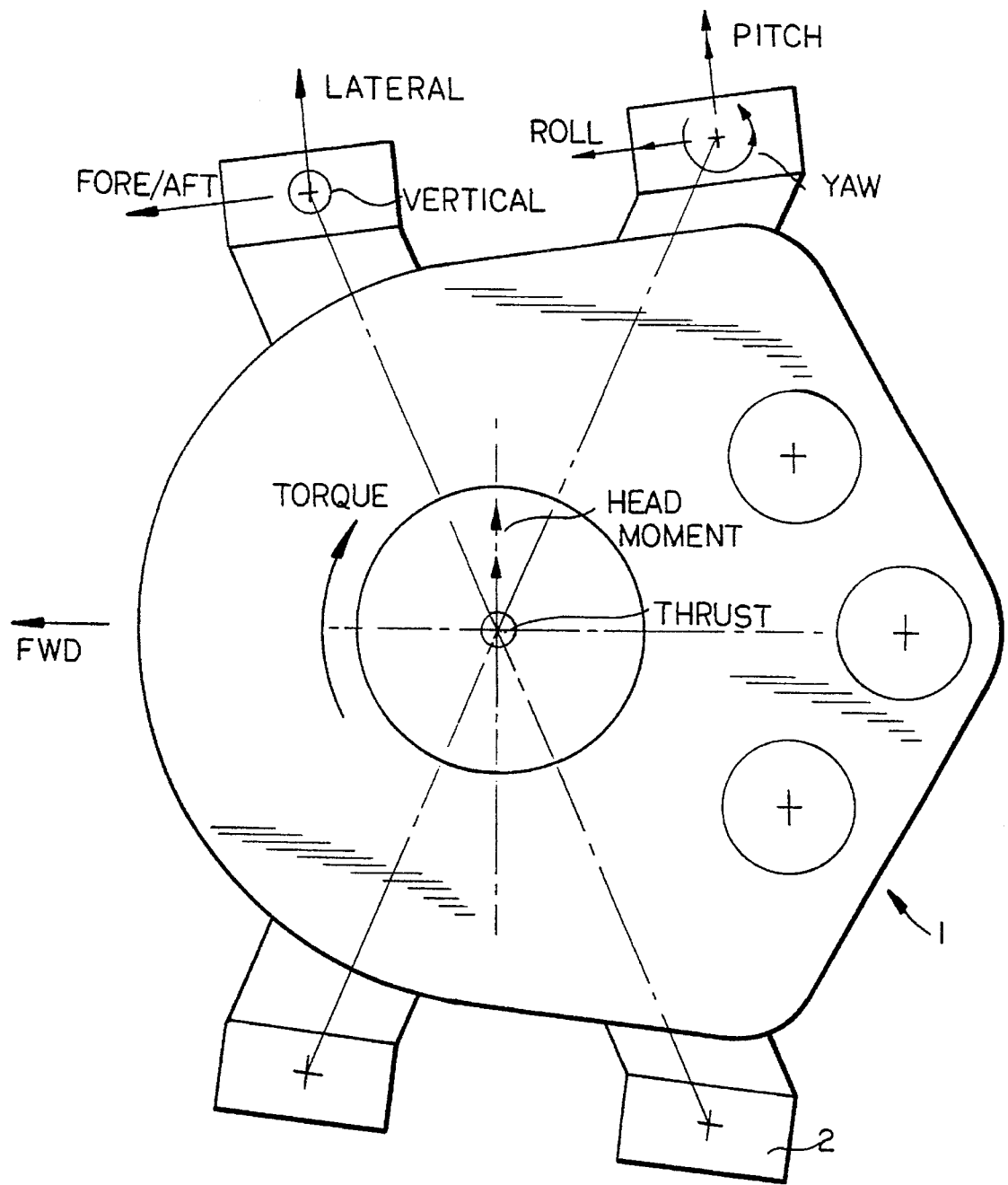
FIG. 1 is a top view of a transmission assembly showing the force directions induced in service.

Referring to FIG. 1, a transmission housing 1 for a helicopter aircraft is shown. The housing has four mounting pads 2 which are used to attach the housing to an adjacent frame structure (not shown). The housing encases various gears, pinions, etc. for driving a helicopter rotor, not shown. The various forces which must be reacted by the housing relate to the various flight regimes. Aircraft thrust which results in lift applies a vertical loading, the engine power results in an applied torque and the rotor head adds a corresponding head moment and changes in pitch, roll and yaw during flight maneuvers, add fore/aft, lateral and vertical forces which must be withstood by the frame connections. Consequently, there must be a strong attachment of the transmission housing to the supporting frame.

To successfully contain these loads, rigid bolting of the transmission housing to the frame is required. Yet such bolting provides a path for the structural transmission of noise to the frame.

Referring to FIG. 2, a side cross sectional view of an acoustic isolator 3 of the invention is shown. The isolator 3 acts as a connector between the housing 1 and a frame 4. The isolator has a first fitting 5 attached by a bolt 6 directly to the transmission housing. A second fitting 7 is attached by bolts 8 to the frame 4. The transmission housing pad 2 rests on the frame.

Referring to FIG. 3, a front cross sectional view of the isolator is shown. Between the first fitting 5 and the second fitting 7 is disposed a first elastomer member 9 which is bonded between a first fitting wall 10 and a second fitting wall 11 to attach the two fittings together. The elastomer member is preferably rectangular in shape with its large vertical faces bonding the two fittings together. This allows the first elastomer member to act as a torque bearing, isolating the transmission of noise associated with pitch, roll and yaw forces.

Two bolts 8 attach the second fitting via cylindrical sleeves 12 to the frame. However, chambers 13 are provided between a top surface 14 of the transmission pad and a bottom surface 15 of the second fitting. A second elastomer member 16 is located within the chambers. The second elastomer reacts to lift forces as the transmission pad 2 may transfer lift through the elastomer 16 to the second fitting 7, and from there to the bolts 8.

The inventive isolator has several distinctive advantages. Lateral forces are reacted through the first elastomer member and vertical forces through the second member so each noise path is effectively isolated. In addition, all bolting is direct, i.e., the bolts attaching the first and second fittings to the housing and frame do not incorporate any elastomer sleeves, so reliable bolt preload is achieved and maintained.

The orientation of the two elastomer members provides a relatively low rotational spring rate and low lateral elastomeric spring stiffness which are desirable features for isolating noise transmission.

Referring again to FIG. 3, the transmission pad 2 has a pair of vertical walls 17 and 18. The first fitting has an adjacent vertical wall 19 and the second fitting has a corresponding vertical wall 20. The pad walls are separated from the fitting walls by a pair of gaps 21 and 22.

This arrangement provides adjacent walls which act as stop means for an additional feature, as any overstress condition acting on the first elastomer, would result in the gap closing and result in fitting/pad wall contact. Thus, any elastomer failure would not result in a loss of support or separation of the transmission housing from the frame. Similarly, the location of the second elastomer member between the lower fitting surface and upper pad surface assures that even if the elastomer fails, the bolts would securely hold the housing and frame together.

While the first fitting is shown as having a wall 23 extending at an angle relative to an upper surface 24 of the second fitting, there is no criticality in the orientation of these walls, and the first and second fittings can be tailored to connect any adjacent structures. In addition, these fittings can be made integral, such as by molding, machining, etc., with the noise generating device and supporting structure. However, separate fittings are useful for retrofit applications.

Figure 5:
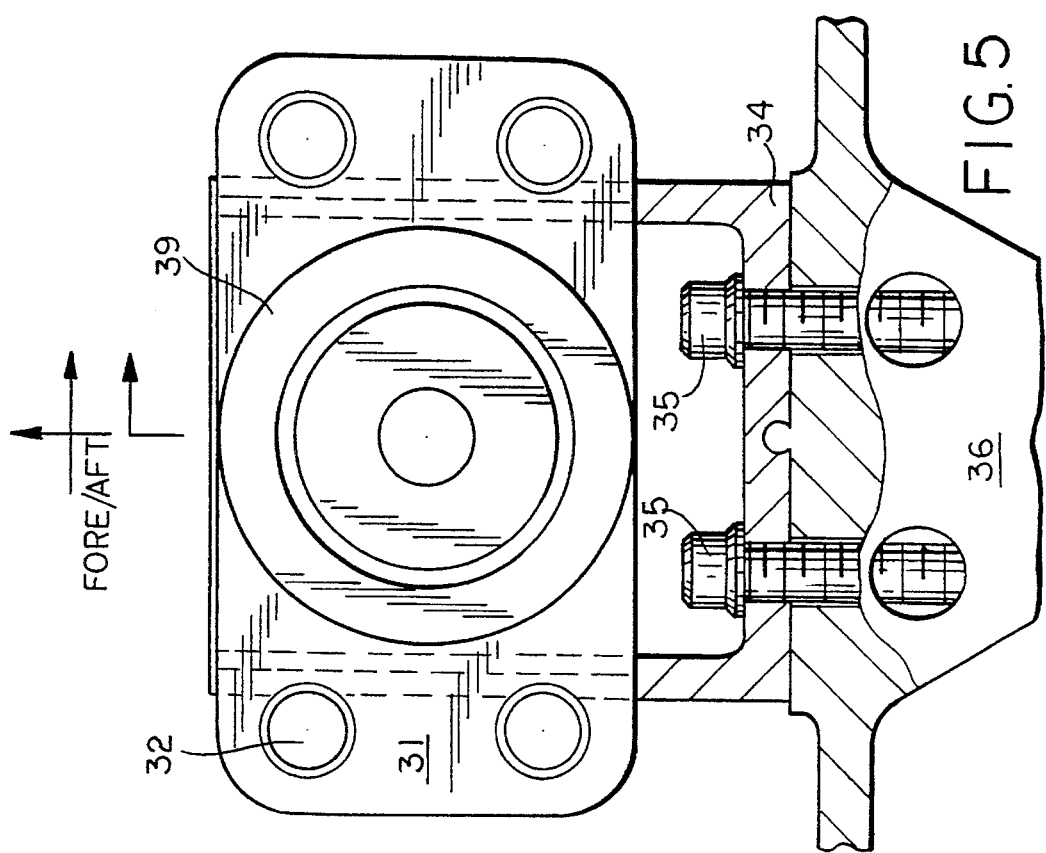
FIG. 5 is side cross sectional view of the acoustic isolator embodiment of FIG. 4.
Figure 4:
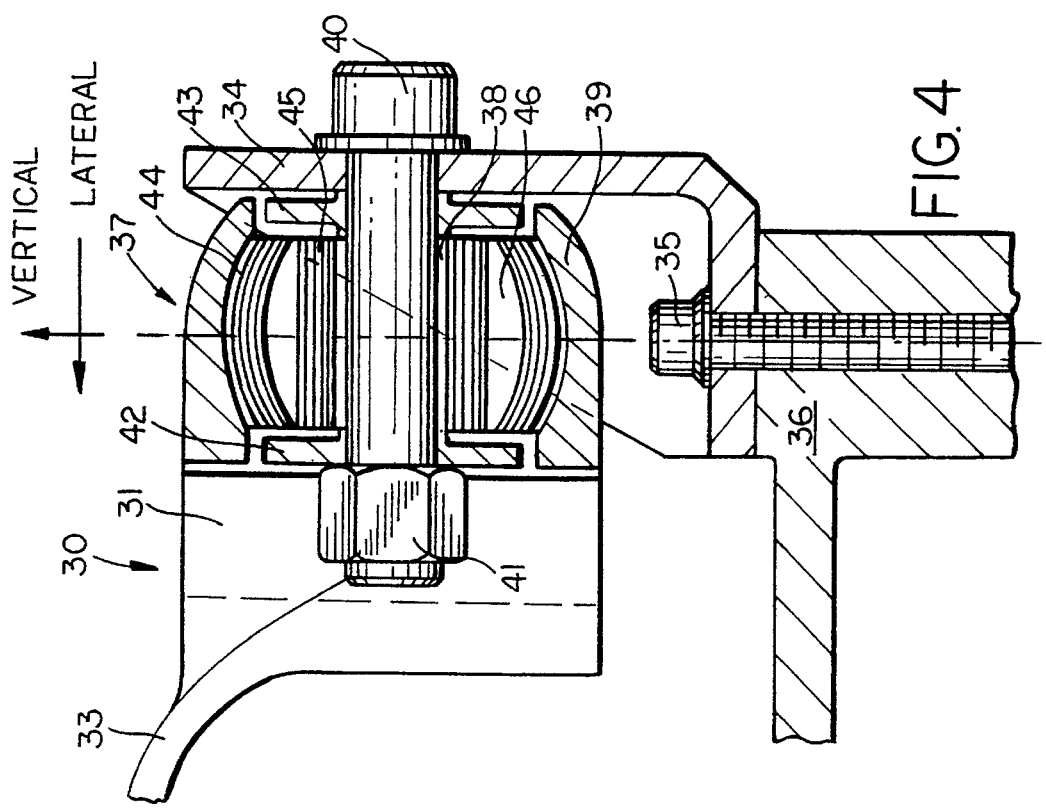
FIG. 4 is a front sectional view of another alternative embodiment of the invention.

Referring to FIGS. 4 and 5, an alternative embodiment of the present invention is shown. An acoustic isolator 30 has a first fitting 31 attached by bolts 32 to a transmission housing 33. A second fitting 34 is attached by bolts 35 to a frame 36. Located therebetween is a spherical bearing 37 which comprises an inner race 38, and an outer race 39. The outer race extends from the first fitting 31, and the inner race is connected by a bolt 40 and nut 41 to the second fitting 34. A pair of stop members 42 and 43 surround a first elastomer member 44 in the form of a sphere and a second elastomer member 45 in the form of a cylinder. A spacer 46 is disposed between the elastomer members.

In this embodiment of the invention, lateral loads are reacted by the cylindrical elastomer with the vertical and fore/aft forces reacted by these spherical elastomer. Consequently, the housing is properly supported yet acoustic transmissions are isolated by the respective elastomers. The orientation of the spherical and cylindrical elastomer members effectively react to these loadings through compression of the elastomers in the vertical and fore/aft directions. Since no primary load is reacted in the lateral direction, the shearing of the cylindrical elastomer in the lateral direction provides effective acoustic isolation. This assembly provides a low rotary spring rate, and again the fasteners rigidly attached the fitting to the associated structures, avoiding the effects of elastomeric creep.

In this embodiment, the stops 42 and 43 associated with the spherical bearing such that even if elastomer failure were to occur the stops would assure that the components would remain attached together.

Figure 6:
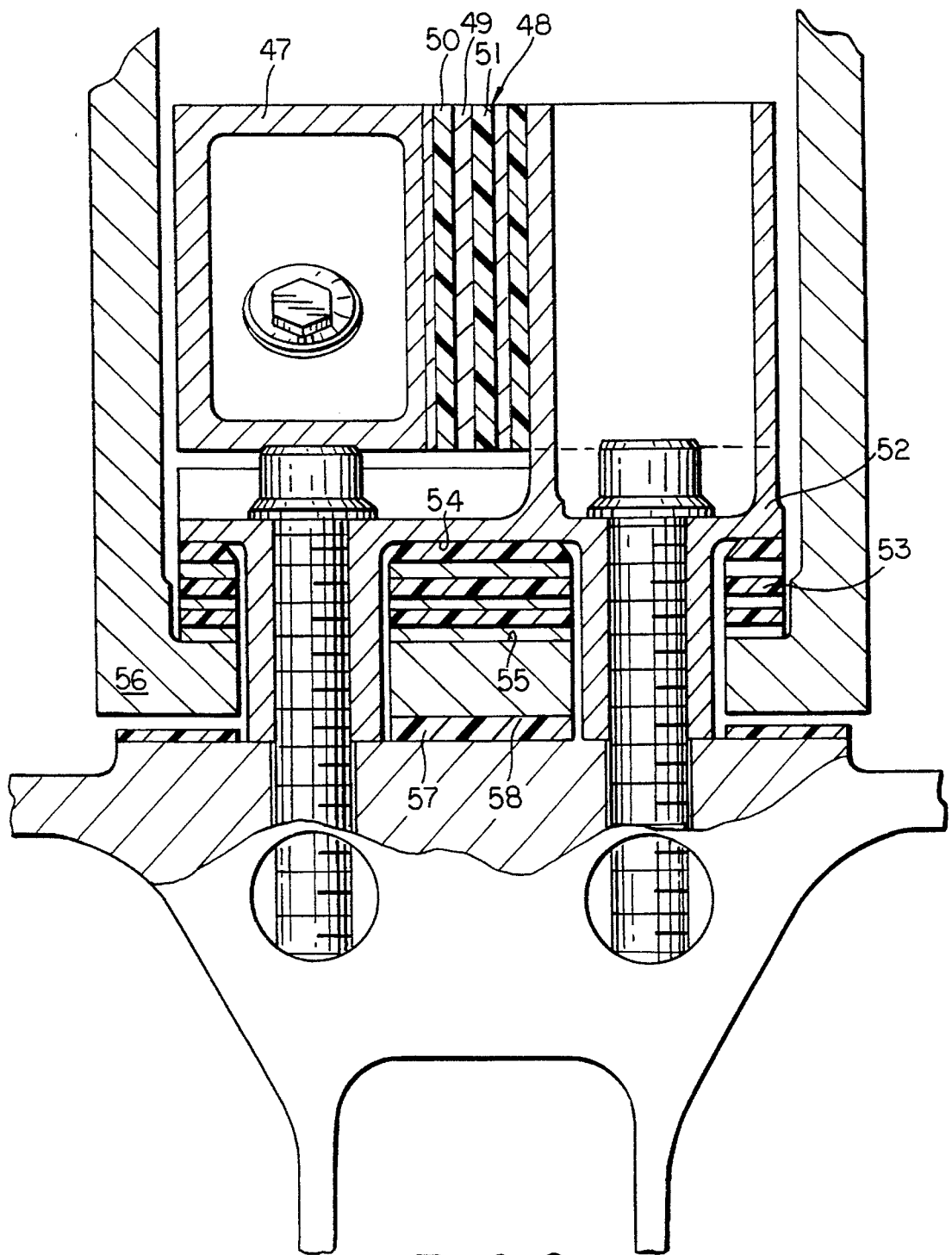
FIG. 6 is an alternative embodiment of the invention.

Referring to FIG. 6, an alternative embodiment of the invention is shown. A first fitting 47 is bonded to a first elastomer member 48 wherein intermediate shims 49 are additionally disposed between adjacent plies 50 and 51. These shims are optionally included. A second fitting 52 has a second elastomer member 53 located between a lower surface 54 thereof and an upper surface 55 of a pad 56. A thin support pad 57 is located between the pad 56 and a lower surface 58 of the second fitting. This support pad is used to support the weight of the transmission during nonflight conditions and to provide an elastic stop during transient negative G maneuvers.

The elastomer members may be composed of a unitary elastomer block as shown in FIGS. 2 and 3 or comprise an assembly of laminate plies, as shown in FIGS. 4 and 5. When plies are used, the members may optionally incorporate rigid shims therebetween, as shown in FIG. 6. Rigid shims may also be used with the unitary elastomer block. In either embodiment, such shims can be used to adjust the compressive stiffness relative to the shear stiffness. In other words, the shims can make the elastomer "harder" by increasing elastomer compression, or "softer" by reducing the compression.

The elastomer material may be chosen from the group consisting of natural rubber, synthetic rubber, silicon, or other resilient or semi-resilient materials. Preferably, the elastomer members are composed of a plurality of laminate plies, and the plies may all be composed of one material assembled together, or be a combination of several materials. For example, half the plies could be natural rubber, the other half synthetic rubber, though numerous other combinations are contemplated. The elastomer member would be assembled, with the materials, number of plies and/or shims chosen in accordance with the desired properties.

EXAMPLE I

A rigid bolting between an airframe structure and a transmission housing, which did not incorporate acoustic isolators, was tested to determine baseline acoustic performance. The noise in decibels was measured in three direction. The decibel levels were measured at 7 locations in the cabin of a helicopter aircraft associated with the airframe structure. The results are shown in Table 1.

TABLE I

| X | Y | Z |
|---|---|---|
| \multicolumn{3}{c}{No Isolation, in decibels} | | |
| 98.3 | 97.3 | 91.3 |
| 101.1 | 100.4 | 99.2 |
| 99.2 | 99.4 | 97.8 |
| 96.5 | 97.5 | 99.0 |
| 95.5 | 96.0 | 92.9 |
| 87.3 | 87.3 | 86.8 |
| 96.5 | 96.2 | 95.0 |
| \multicolumn{3}{c}{Cabin Avg. SPL} | | |
| 96.7 | 97.0 | 96.2 |

EXAMPLE 2

The acoustic isolator produced in accordance with the embodiments of FIGS. 2 and 3 was rigidly bolted between the transmission housing and the aircraft frame. The noise levels were measured in the same locations. The results are shown in Table II.

TABLE II

| X | Y | Z |
|---|---|---|
| \multicolumn{3}{c}{Inventive Isolator, in decibels} | | |
| 84.1 | 83.8 | 82.4 |
| 83.6 | 85.8 | 82.9 |
| 82.6 | 80.2 | 81.2 |
| 77.6 | 83.0 | 81.7 |
| 81.6 | 83.4 | 79.6 |
| 72.5 | 80.8 | 79.2 |
| 81.6 | 82.1 | 81.6 |
| \multicolumn{3}{c}{Cabin Avg. SPL} | | |
| 81.6 | 83.1 | 81.4 |

EXAMPLE III

The test was repeated using the acoustic isolator of FIGS. 2 and 3 with the lateral stiffness softened, by taking out the rigid reinforcing shims. The results are shown in Table III.

TABLE III

| X | Y | Z |
|---|---|---|
| \multicolumn{3}{c}{Inventive Isolator, in decibels w/lateral shims removed} | | |
| 63.6 | 59.5 | 59.8 |
| 73.1 | 78.9 | 73.2 |
| 71.5 | 75.9 | 68.8 |
| 69.9 | 77.0 | 72.6 |
| 66.8 | 73.8 | 71.1 |
| 49.4 | 62.8 | 59.1 |
| 69.5 | 73.6 | 70.9 |
| \multicolumn{3}{c}{Cabin Avg. SPL} | | |
| 69.4 | 74.8 | 70.2 |

Utilizing the inventive isolator, noise transmission was substantially reduced in each of the X, Y and Z directions, yet the structural integrity of the attachment between the adjacent structures was assured. Consequently, the invention can successfully be used for reducing structurally transmitted noise from a noise generating device to an adjacent structure.

While preferred embodiments of the present invention have been shown and described, it will be understood by those skilled in the art that various changes and modifications could be made without varying from the scope of the invention. In particular, it should be understood by those skilled in the art that the acoustic isolator can be used with virtually any type of noise generating equipment to acoustically isolate that equipment from adjacent structures, and the application of the device is not limited to aircraft.

What is claimed is:

1. An acoustic isolator for reducing structural noise transmission from a noise generating device to a supporting structure, the device and structure connected to each other by the acoustic isolator, the acoustic isolator comprising a first fitting, attached to a noise generating device, a second fitting attached to the supporting structure, and an acoustic attenuation means disposed between the first and second fittings such that noise generated in the noise generating device is substantially reduced prior to transmission through the second fitting to the supporting structure, the acoustic attenuation means being a spherical bearing having an outer race extending from the first fitting, and an inner race extending from the second fitting, a spherical elastomer element located between the inner and outer races.

2. The acoustic isolator of claim 1, further comprising a cylindrical elastomer member disposed between the inner race and the spherical elastomer element.

3. The acoustic isolator of claim 1, wherein a pair of stops are disposed on opposite ends of the spherical elastomer element to prevent separation of the fittings in an overstress condition.

4. The acoustic isolator of claim 1, wherein the spherical elastomer element is composed of a plurality of laminate plies, the plies composed of a material selected from the group consisting of natural rubber, synthetic rubber, silicon, and combinations thereof.

5. The acoustic isolator of claim 4, wherein rigid shims are disposed between adjacent plies.

6. The acoustic isolator of claim 1 further comprising rigid shims incorporated with the spherical elastomer element to adjust the compressive stiffness thereof.

7. A method for reducing structural noise transmission from a noise generating device to a supporting structure comprising:

providing an acoustic isolator having a first fitting attached to the noise generating device, a second fitting attached to the supporting structure, and an acoustic attenuation means disposed between the first and second fittings such that noise generated in the noise generating device is substantially reduced prior to transmission through the second fitting to the supporting structure, the acoustic attenuation means being a spherical bearing having an outer race extending from the first fitting, and an inner race extending from the second fitting, a spherical elastomer element located between the inner and outer races; and placing the acoustic isolator between the noise generating device and the supporting structure.

* * * * *

UNITED STATES PATENT AND TRADEMARK OFFICE
CERTIFICATE OF CORRECTION

PATENT NO. : 5,523,530
DATED : June 4, 1996
INVENTOR(S) : Byrnes et al.

It is certified that error appears in the above-indentified patent and that said Letters Patent is hereby corrected as shown below:

Title page, item [54], change "INSULATOR" to -----ISOLATOR--.

Signed and Sealed this

Twenty-ninth Day of October 1996

Attest:

BRUCE LEHMAN

Attesting Officer     Commissioner of Patents and Trademarks